(12) United States Patent
Fan et al.

(10) Patent No.: US 8,141,885 B2
(45) Date of Patent: Mar. 27, 2012

(54) RACK WITH WHEELS

(75) Inventors: Chen-Lu Fan, Taipei Hsien (TW);
Chih-Kun Shih, Santa Clara, CA (US);
Chun-Hsien Lin, Taipei Hsien (TW)

(73) Assignee: Hon Hai Precision Industry Co., Ltd.,
Tu-Cheng, New Taipei (TW)

( * ) Notice: Subject to any disclaimer, the term of this patent is extended or adjusted under 35 U.S.C. 154(b) by 219 days.

(21) Appl. No.: 12/702,522

(22) Filed: Feb. 9, 2010

(65) Prior Publication Data

US 2011/0095495 A1 Apr. 28, 2011

(30) Foreign Application Priority Data

Oct. 23, 2009 (CN) ...................... 2009 2 0313164 U

(51) Int. Cl.
*B62B 11/00* (2006.01)

(52) U.S. Cl. .................................. 280/30; 16/32; 16/34

(58) Field of Classification Search .................... 280/37, 280/43.1, 43.17; 16/32, 34; 190/18 A
See application file for complete search history.

(56) References Cited

U.S. PATENT DOCUMENTS 6,507,975 B2 * 1/2003 Maupin et al. .................... 16/34

* cited by examiner

*Primary Examiner* — J. Allen Shriver, II
*Assistant Examiner* — James Triggs
(74) *Attorney, Agent, or Firm* — Altis Law Group, Inc.

(57) ABSTRACT

A rack includes a chassis, and a plurality of wheel assemblies secured to the chassis. Each wheel assembly includes a bracket, a wheel, and a handle. The bracket is rotatable relative to the chassis between a first position and a second position. Each wheel is capable of rotating about an axis. A distance between the axis and the chassis when each bracket is in the first position is less than a distance between the axis and the chassis when the bracket is in the second position. The handle is secured to the bracket and configured to rotate the corresponding bracket, and extends inside the chassis.

20 Claims, 6 Drawing Sheets

RACK WITH WHEELS

BACKGROUND

1. Technical Field

The present disclosure relates to racks, particularly to a wheeled server rack.

2. Description of Related Art

Server racks are usually supported by posts. When moved, two or more persons are usually required to lift the server rack and then move it to a predetermined location. This is very inconvenient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
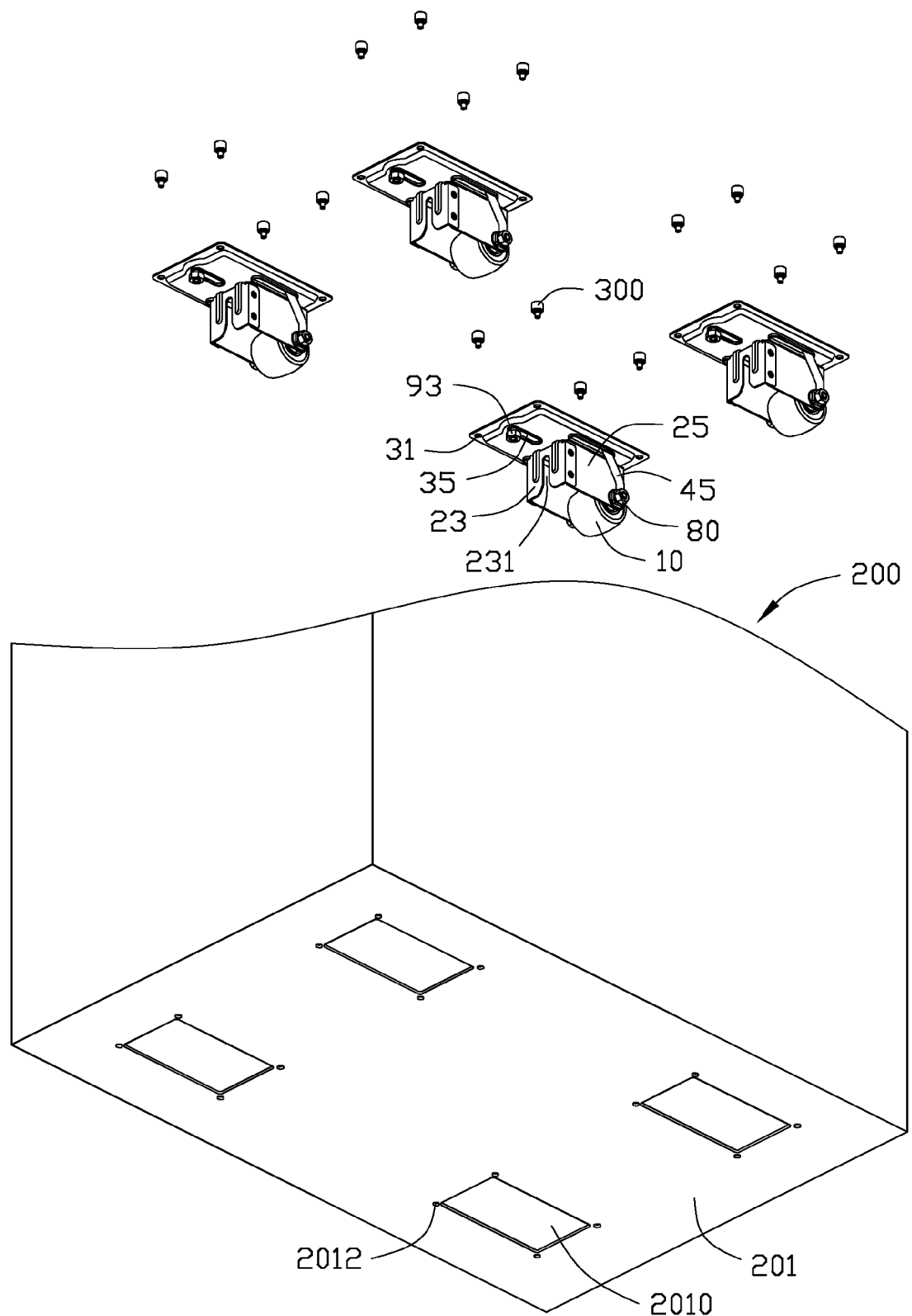
FIG. 1 is an exploded view of a rack in accordance with an embodiment, and only a part of the rack chassis is shown.

Referring to FIG. 1, a rack in accordance with an embodiment includes a chassis 200, and a plurality of wheel assemblies 100 configured to be secured to the chassis 200.

The chassis 200 includes a bottom wall 201. The bottom wall 201 defines a plurality of openings 2010. In one embodiment, the openings 2010 are rectangle. A plurality of fastening holes 2012 is defined in the bottom wall around each opening 2010.

Figure 2:
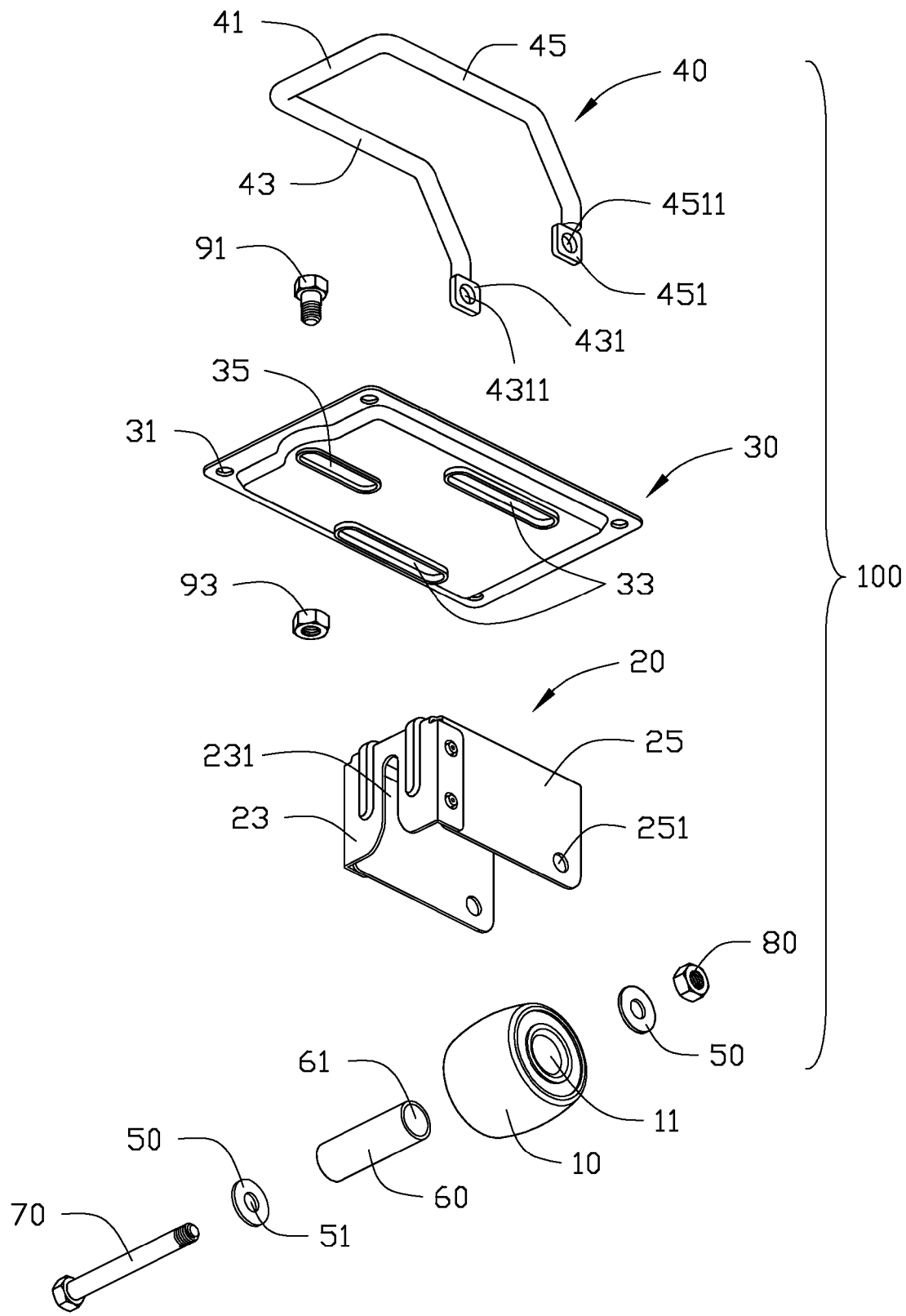
FIG. 2 is an exploded view of a wheel assembly of FIG. 1.

Referring to FIG. 2, each wheel assembly 100 includes a securing plate 30, a bracket 20, a wheel 10, and a handle 40.

The securing plate 30 is configured to be secured to the bottom wall 201. The securing plate 30 defines a plurality of through holes 31, corresponding to the fastening holes 2012. Two first slots 33 and a second slot 35 are defined in the securing plate 30. In one embodiment, the first slots 33 and the second slot 35 are elongated.

The bracket 20 includes a top wall 21 (shown in FIG. 6), a first sidewall 23, and two opposite second sidewalls 25. The top wall 21 connects the first sidewall 23, and the second sidewalls 25, and the first sidewall 23 connects the two second sidewalls 25. In one embodiment, the top wall 21 is substantially perpendicular to the first sidewall 23, the first sidewall 23 is substantially perpendicular to the second sidewalls 25, and the two second sidewalls 25 are substantially parallel to each other. The first sidewall 23 defines a cutout 231. Each second sidewall 25 defines a locking hole 251 at a corner far away from the top wall 21 and the first sidewall 23.

The wheel 10 is configured to be received in the bracket 20. A hub 11 is defined in the wheel 10. The hub 11 is configured to receive a sleeve 60. The sleeve 60 defines a sleeve hole 61, configured for receiving a shaft 70, such as a bolt or an axle.

The handle 40 includes a grip portion 41 and two arm portions 45 connected by the grip portion 41. A block 451 is located on a distal end of each arm portion 45. Each block 451 defines a block hole 4511 corresponding to the locking holes 251 of each bracket 20.

Figure 3:
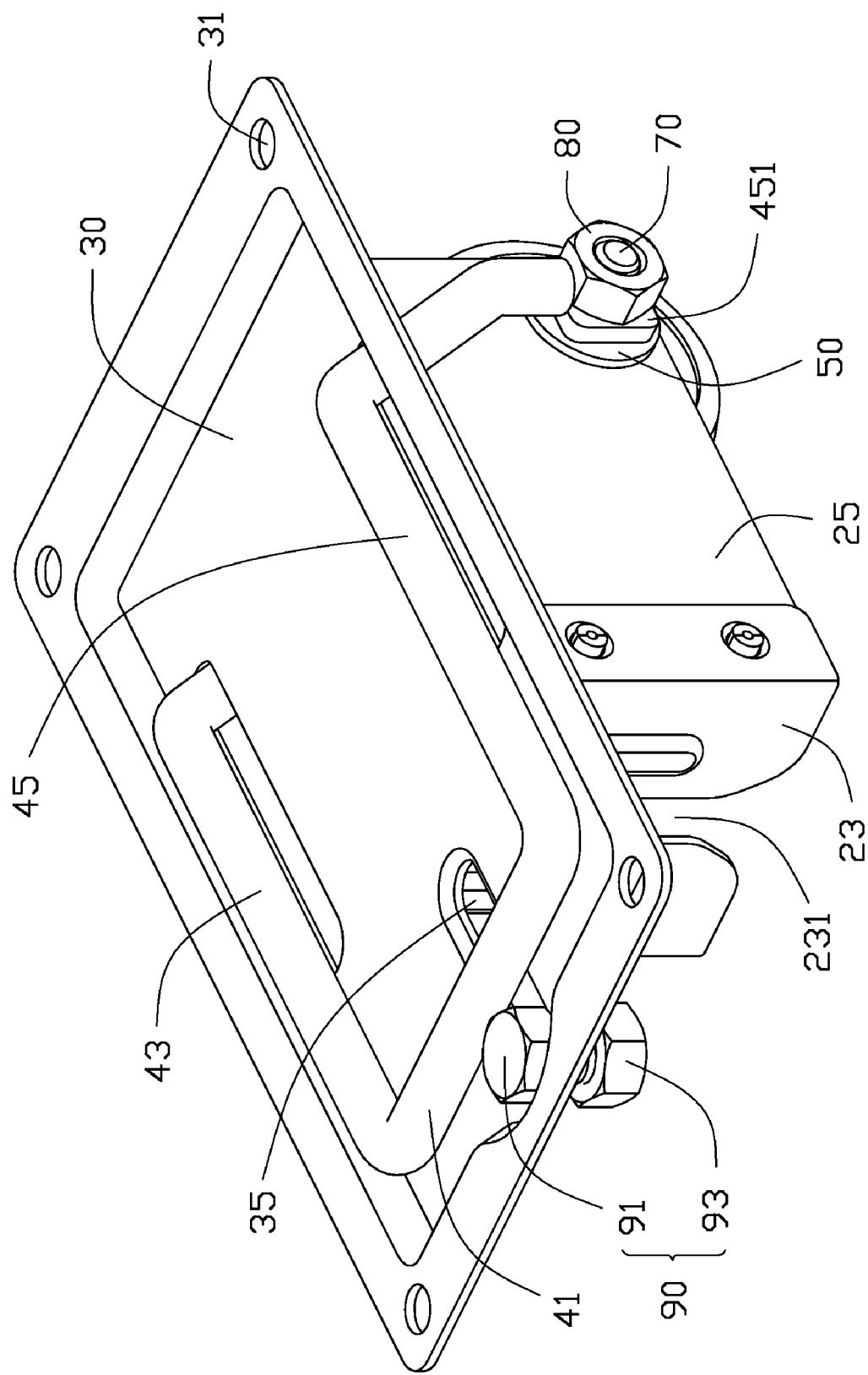
FIG. 3 is an assembled view of the wheel assembly of FIG. 2.
Figure 4:
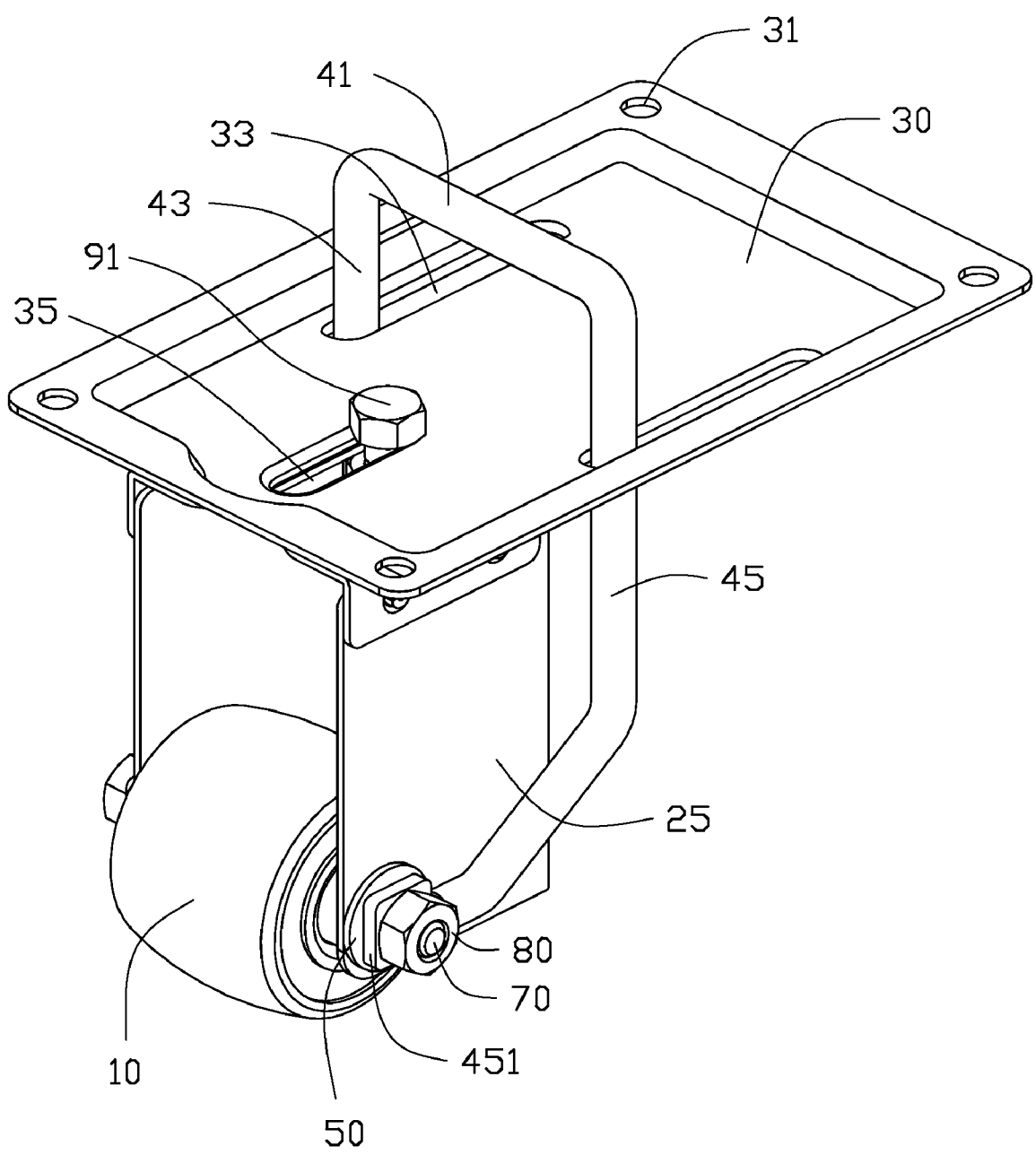
FIG. 4 is similar to FIG. 3, but showing a bracket in a different position.

Referring also to FIGS. 3-4, in the assembly of each wheel assembly 100, each bracket 20 is placed on a bottom surface of the securing plate 30. The first sidewall 23 abuts against the bottom surface of the securing plate 30. The cutout 231 of the first sidewall 23 corresponds to the first slot 35 of the securing plate 30. The handle arm portions 45 are inserted through the second slots 33, and the blocks 451 are positioned between the second sidewalls 25. The block holes 4511 correspond to the locking holes 251 of the second sidewalls 25.

The sleeve 60 is engaged in the hub 11, and together with the wheel 10 placed in the bracket 20 between the second sidewalls 25. The locking holes 251 correspond to the hub 11. The shaft 70 is inserted through the block holes 4511, the locking holes 251, the sleeve hole 61, and the hub 11. A nut 80 is screwed on an end of the shaft 70 to secure the wheel 10 and the handle 40 to the bracket 20. The wheel 10 is rotatable about the shaft 70 (i.e. on an axis). In one embodiment, two washers 50 are respectively secured between blocks 451 of the connecting component 40 and the second sidewalls 25, so as to securely mount the wheel 10 on the bracket 20.

A locking bolt 90 is secured in the first slot 35 and the cutout 231. The locking bolt 90 prevents the first sidewall 23 from moving away from the securing plate 30. The locking bolt 90 is slidably locked in the first slot 35. In one embodiment, the locking bolt 90 includes a bolt 91 and a nut 93 threaded to the bolt 91.

The bracket 40 has a first position (shown in FIG. 3) and a second position (shown in FIG. 4). In the first position, the locking bolt 90 is disengaged from the cutout 231. The top wall 21 abuts against the securing plate 30. The grip portion 41 abuts the securing component 40. In one embodiment, in the first position, the top wall 21 is substantially parallel to the securing component 40, and the first sidewall 23 is substantially perpendicular to the securing component 40. In the second position, the locking component 90 is engaged in the cutout 231. The first sidewall 21 abuts on the securing component 40. The grip portion 41 is positioned above the securing component 40. In one embodiment, in the second position, the top wall 21 is substantially perpendicular to the securing component 40, and the first sidewall 23 is substantially parallel to the securing component 40. A distance between the axis and the securing component 40 in the first position is less than a distance in the second position.

Figure 5:
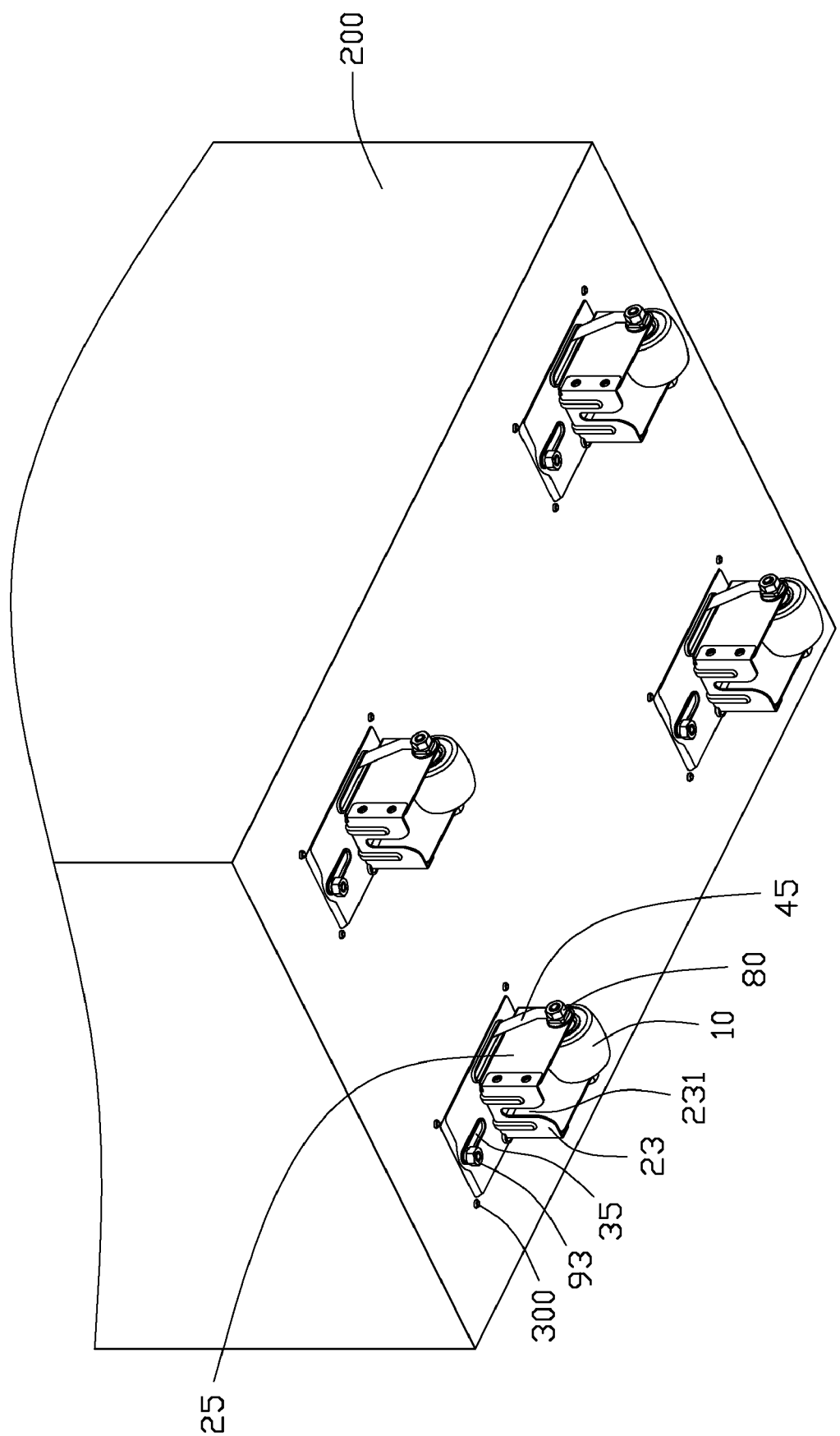
FIG. 5 is an assembled view of the rack of FIG. 1.
Figure 6:
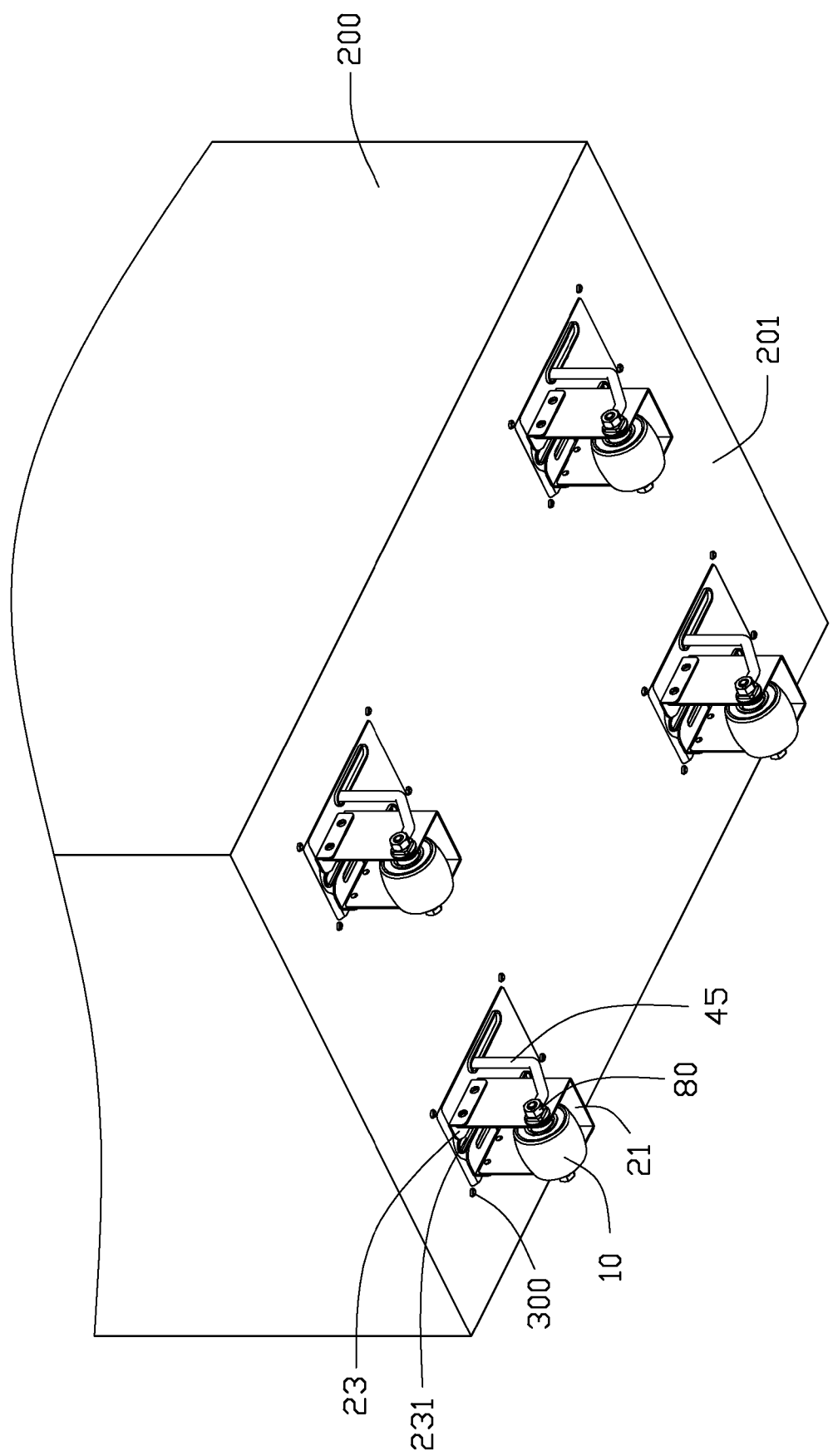
FIG. 6 is similar to FIG. 5, but showing each bracket in a different position.

Referring also to FIGS. 5-6, the wheel assemblies 100 are secured to the bottom wall 201 of the chassis 200. The grip portions 41 are inserted inside the chassis 200 via the corresponding openings 2010. The through holes 31 of the wheel assemblies 100 correspond to the fastening holes 2012 of the chassis 200. A plurality of fasteners 300, such as screws, is screwed into the through holes 31 and the fastening holes 2012, to secure the wheel assemblies 100 to the chassis 200.

In use, to move the rack, the wheel assemblies 100 are adjusted with the handles 40 to rotate the brackets 20 from the first position to the second position. After the rack is moved, the wheel assemblies 100 are adjusted to rotate the brackets 20 from the second position to the first position again.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A rack comprising:
    a chassis;
    a securing plate secured to the chassis and located outside the chassis; and
    a plurality of wheel assemblies secured to the securing plate;
    each wheel assembly comprising a bracket, a wheel and a handle; the bracket being rotatable relative to the securing plate between a first position and a second position; each wheel capable of rotating about an axis, and a distance between the axis and the securing plate when each bracket is in the first position is less than a distance between the axis and the securing plate when each bracket is in the second position; the handle is secured to the bracket and configured to rotate the corresponding bracket; and the handle extends inside the chassis.

2. The rack of claim 1, wherein the bracket of each wheel assembly comprises a bracket top wall, a bracket first sidewall, and two second bracket sidewalls; the first bracket sidewall and the second bracket sidewalls are connected to the bracket top wall; and the wheel is secured between the second bracket sidewalls.

3. The rack of claim 2, wherein the wheel is secured to the bracket with a distance between the bracket top wall and the first bracket sidewall; and the axis of each wheel is substantially perpendicular to the second bracket sidewalls and parallel to the bracket top wall and the first bracket sidewall.

4. The rack of claim 2, wherein the first bracket sidewall and the second bracket sidewalls are substantially perpendicular to the bracket top wall; the first bracket sidewall is substantially perpendicular to the second bracket sidewall; and the second bracket sidewalls are substantially parallel to each other.

5. The rack of claim 2, wherein the chassis comprises a chassis bottom wall; and the bracket top wall is substantially parallel to the chassis bottom wall when each bracket is in the first position, and substantially perpendicular to the chassis bottom wall when each bracket is in the second position.

6. The rack of claim 5, wherein the first bracket sidewall is substantially perpendicular to the chassis bottom wall, when the bracket is in the first position, and substantially parallel to the chassis bottom wall, when the bracket is in the second position.

7. The rack of claim 5, wherein the securing plate secured to the chassis bottom wall; the securing plate defines two first slots; and the handle is inserted through the first slots.

8. The rack of claim 7, wherein the handle comprises a grip portion and two arm portions extend from opposite ends of the grip portion; the grip portion is positioned inside the chassis; and the arm portions are inserted through the first slots of the securing plate, and secured to the second bracket sidewalls.

9. The rack of claim 7, wherein the first bracket sidewall defines a cutout; the securing plate defines a second slot; and a locking bolt is disengaged from the second slot when each bracket is in the first position, and received in the cutout and the second slot when the bracket is in the second position.

10. The rack of claim 8, wherein the chassis bottom wall defines a plurality of openings; and
    the handle grip portions are inside the chassis through the chassis bottom wall opening.

11. A rack comprising:
    a chassis comprising a chassis bottom wall; and
    a plurality of wheel assemblies secured to the chassis bottom wall; each wheel assembly comprising a bracket, a wheel secured to the bracket, a shaft, and a handle; the bracket being movable relative to the chassis between a first position and a second position; each bracket comprising a bracket top wall; and the bracket top wall being substantially parallel to the chassis bottom wall when each bracket is in the first position, and substantially perpendicular to the chassis bottom wall when each bracket is in the second position; the shaft is secured to the wheel, the handle is secured to the bracket with the shaft, and the bracket and the wheel are rotatable relative to the handle about the shaft; and the handle is configured to move the corresponding bracket between the first position and the second position.

12. The rack of claim 11, wherein each bracket further comprises a first bracket sidewall; and
    the first bracket sidewall is substantially perpendicular to the chassis bottom wall, when the bracket is in the first position, and substantially parallel to the chassis bottom wall, when the bracket is in the second position.

13. The rack of claim 11, wherein the wheel of each bracket is capable of rotating about an axis; and a distance between the axis and the chassis when the bracket is in the first position is less than the distance between each axis and the chassis when the bracket is in the second position.

14. The rack of claim 12, wherein the bracket of each wheel assembly further comprises two second bracket sidewalls; and the wheel is secured between the second bracket sidewalls.

15. The rack of claim 14, wherein the wheel is secured to the bracket with a distance between the bracket top wall and the first bracket sidewall; and the axis of each wheel is substantially perpendicular to the second bracket sidewalls and parallel to the bracket top wall and the first bracket sidewall.

16. The rack of claim 14, wherein each wheel assembly further comprises a securing plate secured to the chassis bottom wall; the securing plate defines two first slots; and the handle is inserted through the first slots.

17. The rack of claim 16, wherein the first bracket sidewall defines a cutout; the securing plate defines a second slot; and a locking bolt is disengaged from the second slot when each bracket is in the first position, and received in the cutout and the second slot when each bracket is in the second position.

18. The rack of claim 16, wherein the handle comprises a grip portion and two arm portions extending from opposite ends of the grip portion; the grip portion is positioned inside the chassis; and the arm portions are inserted through the first slots of the securing plate, and secured to the second bracket sidewalls.

19. The rack of claim 18, wherein the chassis bottom wall defines a plurality of openings; and the handle grip portions are located inside the chassis through the bottom wall opening of the chassis.

20. The rack of claim 12, wherein the first bracket sidewall and the second bracket sidewalls are substantially perpendicular to the bracket top wall; the first bracket sidewall is substantially perpendicular to the second bracket sidewalls; and the second bracket sidewalls are substantially parallel to each other.

* * * * *